United States Patent [19]

Ortega

[11] 4,248,210
[45] Feb. 3, 1981

[54] HEAT-TRANSFER COMPONENT

[76] Inventor: Hugh R. Ortega, 280 Louis Ave., S. Floral Park, N.Y. 11001

[21] Appl. No.: 10,758

[22] Filed: Feb. 9, 1979

[51] Int. Cl.³ .................. F24J 3/02; F24F 3/04; F24B 1/06
[52] U.S. Cl. .................. 126/444; 126/442; 126/446; 165/82
[58] Field of Search .............. 126/442, 444, 445, 446, 126/449; 29/157.3 D; 165/48 R, 82; 237/1 R, 1 A

[56] References Cited

U.S. PATENT DOCUMENTS

| 4,014,313 | 3/1977 | Pedersen | 126/446 |
| 4,069,811 | 1/1978 | Tabor | 126/446 X |
| 4,141,341 | 2/1979 | Ely | 126/444 |

FOREIGN PATENT DOCUMENTS 1492408  11/1977  United Kingdom ............... 29/157.3 D Primary Examiner—George T. Hall
Attorney, Agent, or Firm—Posnack, Roberts, Cohen & Spiecens

[57] ABSTRACT

A solar panel component is provided which has a liquid passage formed by a plurality of perimetral sections connected together to form the passage. At least one fin is provided in extension of one of the sections and monolithically related thereto to optimize heat exchange between the fin and related section. In one embodiment there are two perimetral sections with the fins being in extension thereof in coplanar relationship. The liquid passage may be of circular cross-section or of many other forms such as rectangular, saw-toothed, trapezoidal, polygonal and semicircular. In some embodiments of the invention, one of the sections is part of a flat sheet of heat conductor material. In another embodiment of the invention, a passage forming section for a further liquid passage is provided connected to the fin of the first liquid passage formed as indicated above. The members can also be connected together in a closed loop so that a main liquid passage is provided with other passages perimetrally located thereabout.

19 Claims, 13 Drawing Figures

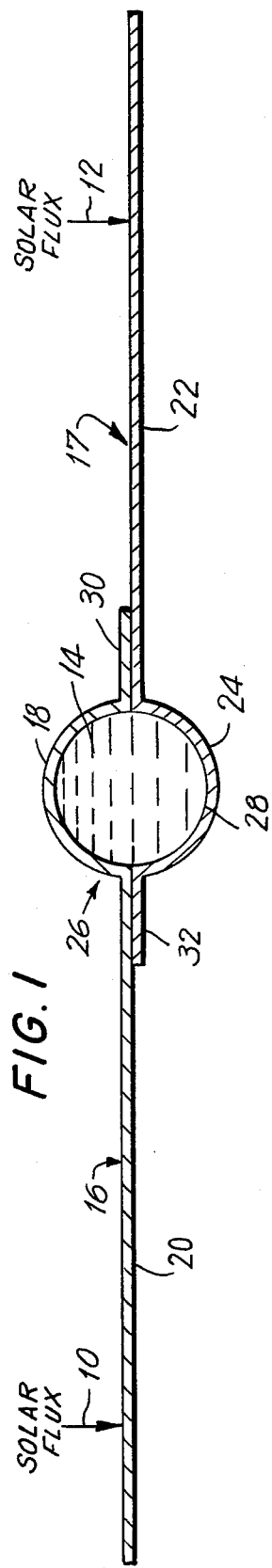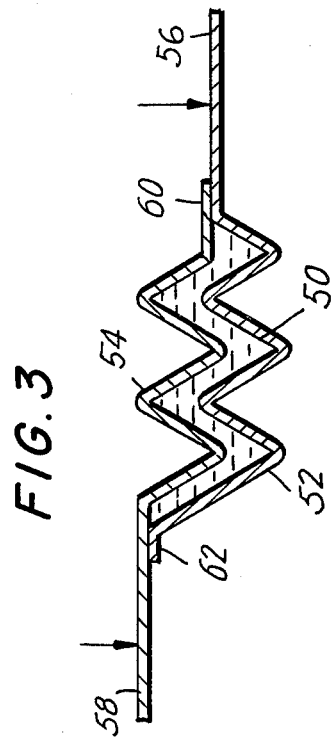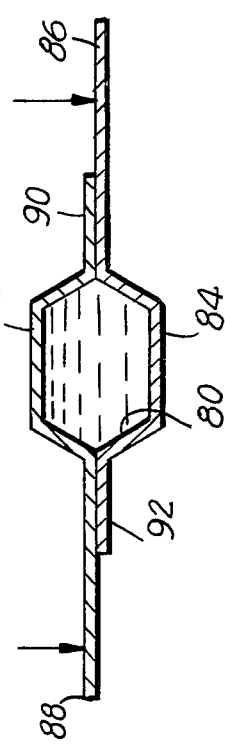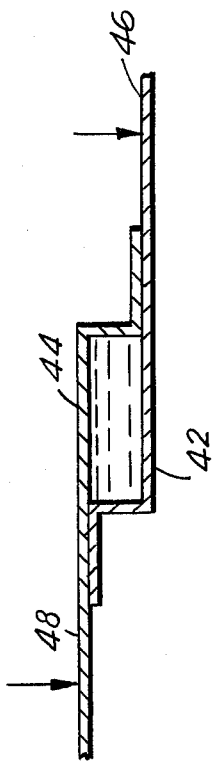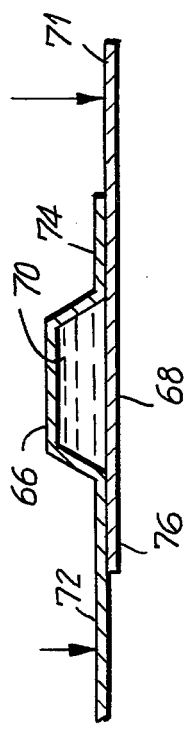

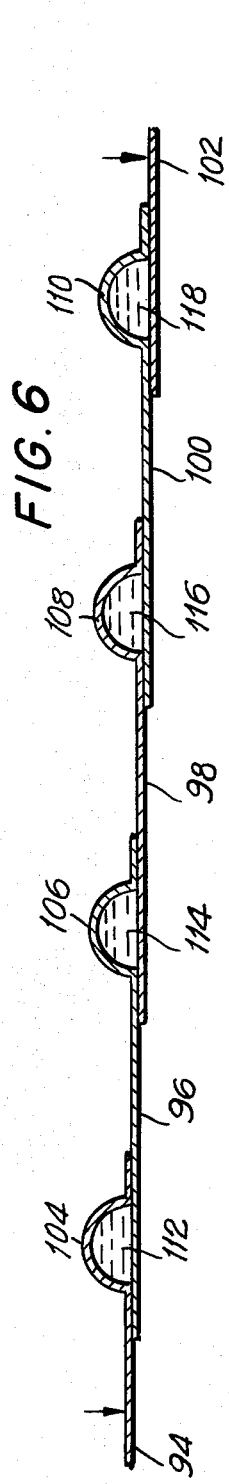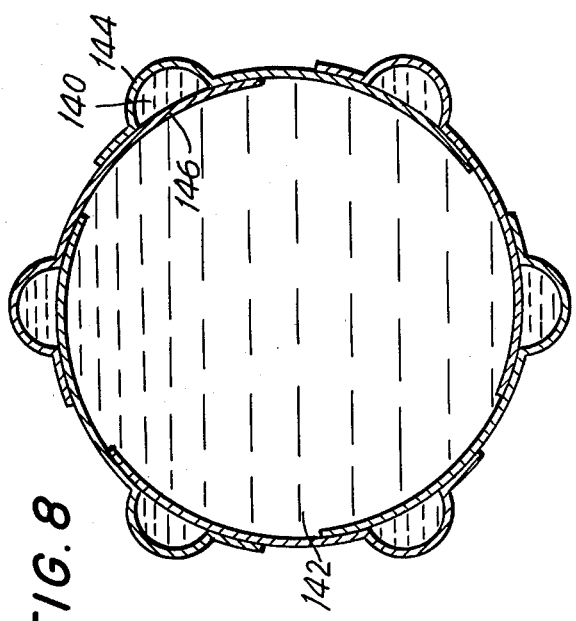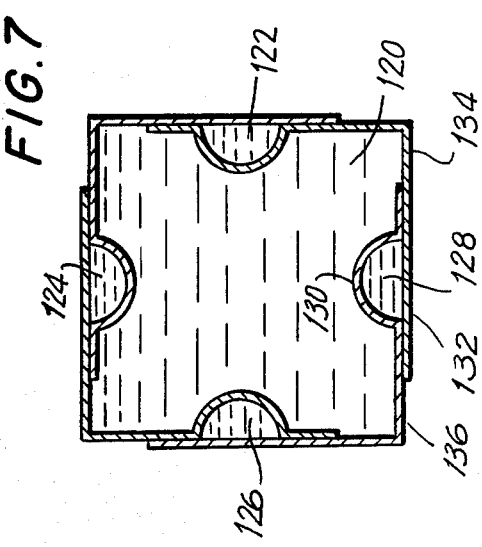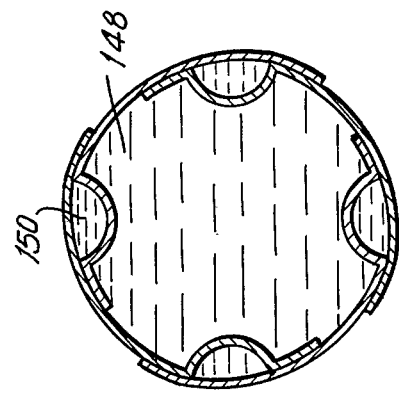

U.S. Patent Feb. 3, 1981 Sheet 3 of 3 4,248,210

HEAT-TRANSFER COMPONENT

FIELD OF THE INVENTION

This invention relates to heat transfer and more particularly to solar heating and specifically to heat transfer apparatus and methods for making the same.

BACKGROUND

Heat transfer apparatus is known for transferring heat from a heat collector to a transporting medium. A specific form of such heat transfer apparatus is a solar panel.

In one form, a solar panel consists of a transparent material situated above a collector constructed to act as a black body to absorb heat. The solar rays pass through the transparent material and are absorbed by the collector. The heat may then be transferred to a transportation medium which may be, for example, a liquid such as water. The heated water is subsequently used to heat a utilization structure such as a home or a swimming pool.

It is known that solar panels have been modified in various ways to improve their absorbing properties. Some of these improvements have been patented, for example, in U.S. Pat. Nos. 4,007,728; 3,957,109 and; 3,995,615. None of these patents, however, relate to the provision of finned tubing and consequently do not deal with the improvements of the instant invention.

SUMMARY OF THE INVENTION

There are many advantages to the present invention that are lacking in solar panels or collectors available in the prior art. These advantages include the following:
1. Maximum material savings
2. Use of inexpensive flat thin sheets which are strengthened by the design of the invention
3. A design which permits a high rate of production
4. The forming of a solar panel by the joining of similar or nearly similar sections which can be effected in a continuous operation
5. The design lends itself to many different cross-sections which will be explained in greater detail hereinbelow It is a primary object of the invention to provide an improved heat transfer apparatus and components therefor.

It is a more particular object of the invention to provide improved components particularly suitable for use in solar panels.

It is still another object of the invention to provide improved components for heat-transfer apparatus which can be manufactured with mass production techniques at relatively low cost.

In achieving the above and other objects of the invention, there is provided in accordance with one embodiment thereof a heat-transfer apparatus comprising at least one tubular member including a plurality of perimetral sections connected together in liquid tight relation to form a liquid passage, and at least one fin in extension of one of said sections and monolithically related thereto so as to optimize heat exchange between the fin and related section.

As a feature of the invention, the entire tubular member is directly heated by conduction from respective fins which are each fully exposed to radiation for purposes of heating. Thus, the fins are not coupled in face-to-face relation which would decrease the efficiency thereof.

In accordance with various embodiments of the invention, the aforesaid tubular member may be of generally circular cross-section or, by way of variation, may be of rectangular, saw-tooth, polygonal, semi-circular, or trapezoidal cross-sections or combinations thereof. Some of these forms are joined directly to their fins without bends. By avoiding bends, the thermal efficiency is substantially improved.

According to a particular embodiment of the invention, said tubular member may be of two perimetral sections and may include two fins respectively in extension of such sections and monolithically related thereto. The aforesaid fins may be at least in part coplanar or may be, at least in part, in generally parallel planes. The material from which the sections are made will preferably be a monolithic sheet of heat conductive material such as copper in the order of 0.005–0.025 inches thickness. In connection therewith, the aforesaid sections will constitute ribs or grooves which serve to strengthen the sheets whereby a relatively thin sheet may be employed while nevertheless obtaining substantial and suitable strength.

According to the invention, the aforesaid sections may be of like shape. According to a modification thereof, one of the sections and the fin which is in extension thereof may cooperatively constitute a flat sheet. Furthermore, another embodiment of the invention may provide a further fin in extension of the last described fin and a further section on said further fin in monolithic relationship therewith and adapted to constitute a further liquid passage.

According to yet another embodiment of the invention, a plurality of said tubular members may be provided and these may be connected together in a closed loop to define a centrally located liquid passage with supplemental liquid passages peripherally located with respect thereto.

According to still another embodiment of the invention, a tube may be provided within the aforesaid passage or passages in face to face relationship with the aforesaid sections. The sections may be connected together in a manner described hereinabove or may be connected together to the intermediary of said tube.

According to another aspect of the invention, a plurality of the aforesaid tubular members may be provided with a frame holding the same together to form a solar panel with the fins being substantially entirely open for exposure to solar rays.

In further accordance with the invention, there is provided a method of making a heat-exchange apparatus comprising continuously supplying two sheets of heat conductive material, forming a groove in at least one of said sheets, and connecting the sheets together at said grooves to form an end closed liquid-tight passage.

Other objects, features and advantages of the invention will be found in the following detailed description of some preferred embodiments as illustrated in the accompanying drawing.

BRIEF DESCRIPTION OF THE DRAWING

In the drawing:

FIG. 1 is a sectional view of a solar panel component provided in accordance with one embodiment of the invention;

FIG. 2 is a variation of FIG. 1 in accordance with a further embodiment of the invention;

FIG. 3 is a further variation in accordance with still another embodiment of the invention;

FIG. 4 is a further modification in accordance with still another embodiment of the invention;

FIG. 5 is a modification in accordance with another embodiment of the invention;

FIG. 6 is a further modification in accordance with yet another embodiment of the invention;

FIG. 7 illustrates a further embodiment of the invention in accordance with which several components are connected together in closed loop form;

FIG. 8 is a variation of FIG. 7;

FIG. 9 is a variation of FIGS. 7 and 8;

DETAILED DESCRIPTION

Figure 11:
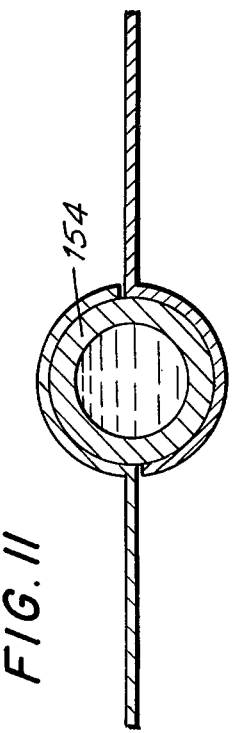
FIG. 11 is a view corresponding to FIGS. 1 and 10 illustrating another embodiment of the invention.

FIG. 1 is a cross-sectional view of a solar panel component provided in accordance with a first embodiment of the invention. It is intended to respond to solar flux as indicated by arrows 10 and 12. The heat received from this flux is transferred via a heat conductive material to a fluid indicated generally at 14. This fluid or liquid may be, for example, water, but in the alternative may be any other liquid or fluid, this term being intended to cover gaseous heat conducting media and the like as well.

The solar panel component illustrated in FIG. 1, consists of two parts generally indicated at 16 and 17. Part 16 includes a semi-circular section 18 having a flat fin 20 connected thereto. These two parts are formed of a heat conductive material such as copper, but other materials such as, for example, aluminum may alternatively be employed. It is important to note that the sections 18 and 20 are part of a single piece of heat conductive material and are therefore monolithically related. The purpose of this is to optimize heat exchange whereby heat picked up by the fin 20 will be passed without loss or interference to the section 18.

Similarly, the part 17 is formed of a fin 22 connected to a semi-circular section 24. These two elements are also in monolithic relationship and are formed from a heat conductive material. The sections 18 and 24 cooperatively form a tubular member indicated generally at 26. This tubular member defines an internal liquid passage generally indicated at 28.

The section 18 is provided with a flange 30. The section 24 is provided with a flange 32. These flanges are in face to face relationship with the fins of the opposite part to which they are connected by various means such as soldering, brazing, continuous spot welding, laser fusion, or the like. By reason of this type of connection, a liquid tight relationship is provided between sections 18 and 24. Accordingly, there is no loss of fluid 14 as the latter flows through the passage 28 in process of collecting the heat gathered by fins 20 and 22.

While the connections between flanges 30 and 32 and the opposed fins may be such as to interfere to a certain degree with the transfer of heat therebetween, it will be noted that the section 18, which is monolithic with the fin 20, and the section 24, which is monolithic with the fin 22, respectively cover 180° portions of the passage 28. Thus, the passage 28 is bounded perimetrally in entirety by a heat conductive part which is monolithic with an associated fin both faces of which are substantially fully exposed. Since the solar flux will generally come from one direction only, the exposure of two faces may not always be significant. However, it is significant in any case that both fins are directly exposed to the solar flux for the direct conducting of heat to all of the sections of the tubular member. Accordingly, a maximum efficiency of heat exchange between the fins and fluid 14 is provided for in accordance with the invention.

FIG. 2 illustrates a rectangular tubular member 40 formed of two similar sections 42 and 44. Tubular section 42 is monolithic with the fin 46, whereas section 44 is monolithic with the fin 48. As in the prior embodiment, the fins are designed to be in extension of the associated sections and are monolithic therewith to provide with the same optimized effectiveness of heat transfer as was described relative to FIG. 1. The same connection is provided between the fins and flanges related to the corresponding sections as has already been described.

FIG. 3 illustrates another embodiment of the invention wherein a passage generally indicated at 50 is provided with a cross-section which is of saw-tooth form. This passage is defined by two cooperating sections 52 and 54. A fin 56 is provided in extension of section 52, whereas a fin 58 is provided which is in extension of section 54. The sections are connected to the opposite fins by means of flanges indicated at 60 and 62. The fins are monolithically formed with respect to the associated tubular sections as a consequence whereof optimization of heat transfer is provided as has been discussed hereinabove.

FIG. 4 illustrates a variation of the invention wherein trapezoidal section 66 is faced by a flat section 68, these two sections cooperatively operating to define a passage 70, the cross-section of which is trapezoidal. It may be regarded that the fin 71 is in extension of the section 68 and is both monolithic and coplanar with respect thereto. It may also be regarded that the fin 72 is in extension of the trapezoidal section 66. Connection is provided between the fins and flanges 74 and 76 and the loss of heat conductive effectiveness therebetween has no consequence because, as in the other embodiments of the invention, the passage 70 is bounded by sections of heat conductive material which are monolithic with the heat collecting fins.

FIG. 5 illustrates another embodiment of the invention wherein passage 80 is of polygonal cross-section. More particularly, the passage 80 is of hexagonal cross-section and is bounded by parts 82 and 84 connected to fins 86 and 88 and monolithic with respect thereto. Connection is made to these fins through the intermediary of flanges 90 and 92. Once again, the liquid flowing through passage 80 has a nearly perfect heat transfer relationship thereto in view of the fact that there is no interruption between the associated fins and such liquid.

In accordance with FIG. 6, there are provided elements 94,96,98,100,102, etc. Each of these sections includes a semi-circular section 104,106,108,110 and so forth. The respective sections 104-110 are connected to the fins of the next adjacent component in "piggy back" relationship. As in the prior embodiments of the invention, the fluid flowing through the passages indicated, for example, at 112,114,116 and 118 has a nearly perfect heat transfer relationship with the associated fins because of the monolithic structure as between the semi-circular sections and the associated fins as well as the flat sections bordering the passageways which are in continuation of, and coplanar with the various fins.

According to FIG. 7, a plurality of components may be connected together in closed loop relationship such as to form a central passage 120 for the flow of a heat transporting medium. This central section will be bordered by peripheral passages 122, 124, 126 and 128. Heat transporting medium may flow through these latter passages in parallel with or in opposition to the direction of flow of the heat transfer medium in passage 120. Referring to the passage 128, by way of example, this is formed by a semi-circular section 130 and a flat section 132. As in the prior embodiments of the invention, fins are provided in extension of sections 130 and 132 and may be regarded as being generally located at 134 and 136. The fins are in monolithic relationship with the associated tubular sections and provide for the same excellence of heat transfer as has been discussed hereinabove.

FIG. 8 illustrates a variation of FIG. 7 wherein a plurality of passages such as indicated at 140 are peripherally located with respect to the central passage 142. Passage 140 and the other peripheral passage are formed by a section 144 and a section 146, both of these sections having fins monolithically provided with respect thereto and formed in extension of these sections.

FIG. 9 illustrates a further variation similar to that of FIG. 8 wherein a central passage 148 is provided with a plurality of peripheral sections 150, these being formed generally as in FIG. 8, but with the semi-circular sections being internally rather than externally located.

Figure 10:
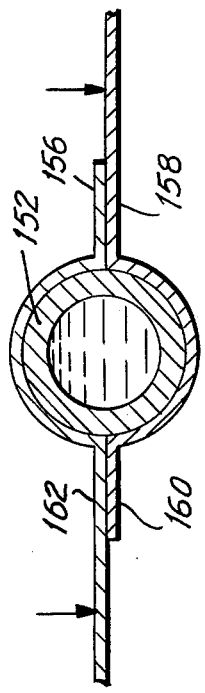
FIG. 10 illustrates yet another embodiment of the invention.

FIGS. 10 and 11 illustrate two further embodiments of the invention involving, as a departure from the foregoing described embodiment, internal monolithic tubes 152 and 154. FIGS. 10 and 11 differ from each other in that in FIG. 10 flange 156 is connected to fin 158 and flange 160 is connected to fin 162. In FIG. 11, the two sections are not connected directly to each other, but are connected through the intermediary of tube 154.

Figure 12:
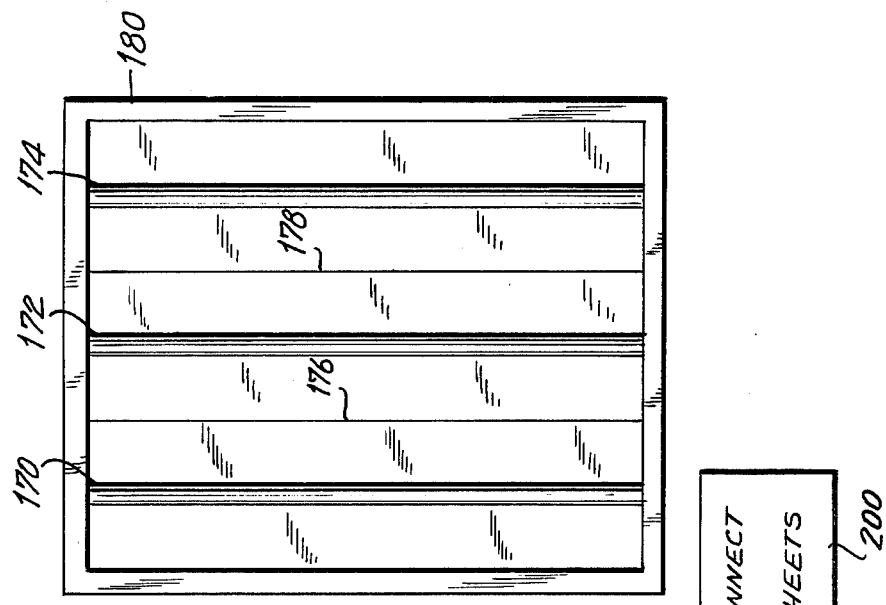
FIG. 12 is a diagrammatic view of a solar panel utilizing the components illustrated, for example, in FIG. 1.

FIG. 12 illustrates a plurality of solar panal components 170, 172, and 174 abutting at edges 176 and 178 and held together generally by a frame 180 in generally coplanar relationship. The solar panel may be covered by a transparent material (not shown) which admits of the passage of solar flux while barring the cooling of the panel by convection.

Figure 13:
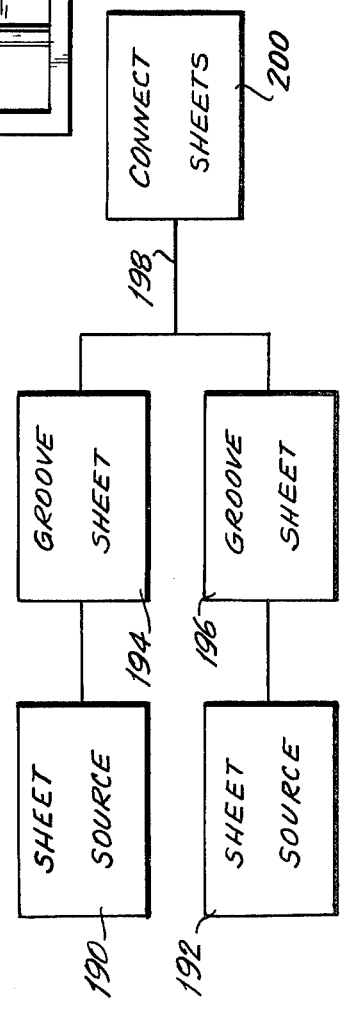
FIG. 13 is a block diagram illustrating the method of the invention.

FIG. 13 illustrates the method of the invention in accordance with which two sheets of relatively thin material such as copper sheet of a thickness in the order of 0.005–0.025 inches thickness is provided in the form of separate rolls. One sheet source, in the form of a roll, is indicated at 190 and a second sheet source is indicated at 192, this also being in the form of a roll. The sheet is continuously supplied to a die which forms a groove therein as indicated for one sheet at 194 and at the second sheet at 196, this being pertinent, for example, to the embodiment illustrated in FIG. 1. The two grooves form the semi-circular sections which are brought together to form the water-tight fluid passage as indicated at 198. The permanent connection of the two sheets is effected at 200, this taking the form of brazing, soldering, continuous spot-welding, laser fusion or the like.

It will be noted, that in accordance with the invention, the loss of heat transfer effectiveness at the connecting point between the two sections is immaterial since the heat transfer fluid passes through a passage completely bounded by tubular sections in extension of which are provided fins which are monolithic therewith.

There will now be obvious to those skilled in the art many modifications and variations of the structures and methods set forth hereinabove, these modifications and variations will not depart from the scope of the invention if defined by the following claims.

What is claimed is:

1. Heat transfer apparatus comprising at least one tubular member including a plurality of perimetral sections connected together in liquid tight relation to form a liquid passage, and fins respectively in extension of each of said sections and monolithically related thereto whereby to optimize heat-exchange between the fin and related section, each said fin having opposite faces, each of said faces of each of said fins being at least substantially free of substantial contacting engagement by any fin on any other of the said section whereby each said fin may be directly exposed to a heat source for heating thereby and whereby each said section is directly heated by conduction of heat from a corresponding one of said fins so that at least substantially the entire tubular member is directly heated by conduction from said fins.

2. Heat transfer apparatus as claimed in claim 1 wherein said tubular member is of generally circular cross-section.

3. Heat transfer apparatus as claimed in claim 1 wherein said tubular member is of generally rectangular cross-section.

4. Heat transfer apparatus as claimed in claim 1 wherein said tubular member is of generally saw-tooth cross-section.

5. Heat transfer apparatus as claimed in claim 1 wherein said tubular member is of generally polygonal cross-section.

6. Heat transfer apparatus as claimed in claim 1 wherein said tubular member is of generally semi-circular cross-section.

7. Heat transfer apparatus as claimed in claim 1 wherein said tubular member is of generally trapezoidal cross-section.

8. Heat transfer apparatus as claimed in claim 1 wherein said tubular member is of two perimetral sections and includes two fins respectively in extension of said sections and monolithically related thereto.

9. Heat transfer apparatus as claimed in claim 8 wherein said fins are at least in part coplanar.

10. Heat transfer apparatus as claimed in claim 8 wherein said fins are at least in part in generally parallel planes.

11. Heat transfer apparatus as claimed in claim 8 wherein each section is a monolithic sheet of heat conductive material in the order of 0.005–0.025 inches thick and wherein the said sections constitute ribs strengthening the sheets.

12. Heat transfer apparatus as claimed in claim 8 wherein said sections are of like shape.

13. Heat transfer apparatus as claimed in claim 8 wherein one of the sections and the fin in extension thereof cooperatively constitute a flat sheet.

14. Heat transfer apparatus as claimed in claim 13 comprising a further fin in extension of the latter said fin and a further section on said further fin in monolithic relationship therewith, said further section being adapted to constitute a part of a further liquid passage.

15. Heat transfer apparatus as claimed in claim 8 comprising at least one further tubular member including two perimetral sections connected together in liquid tight relation and forming a further liquid passage and including fins in extension of the latter said sections and monolithically related thereto, the fins of said tubular members being connected to form a further passage on which the first said liquid passages are peripherally located.

16. Heat transfer apparatus as claimed in claim 8 comprising a tube within said passage and in face-to-face relation with said sections.

17. Heat transfer apparatus as claimed in claim 16 wherein the sections are connected together via said tube.

18. Heat transfer apparatus as claimed in claim 11 wherein the heat conductive material is at least partly of copper.

19. Heat transfer apparatus as claimed in claim 1 comprising a plurality of the tubular members and a frame holding the same together as a solar panel with the fins being substantially entirely open for exposure to the sun.

* * * * *